(12) United States Patent
Jørgensen

(10) Patent No.: US 8,770,762 B2
(45) Date of Patent: Jul. 8, 2014

(54) PROJECTING DEVICE WITH MULTIPLE MUTUAL BOOSTING LIGHT SOURCES

(75) Inventor: Dennis Jørgensen, Rønde (DK)

(73) Assignee: Martin Professional A/S, Aarhus N. (DK)

( * ) Notice: Subject to any disclaimer, the term of this patent is extended or adjusted under 35 U.S.C. 154(b) by 0 days.

(21) Appl. No.: 13/636,464

(22) PCT Filed: Mar. 15, 2011

(86) PCT No.: PCT/DK2011/050084
§ 371 (c)(1),
(2), (4) Date: Sep. 21, 2012

(87) PCT Pub. No.: WO2011/116769
PCT Pub. Date: Sep. 29, 2011

(65) Prior Publication Data
US 2013/0027442 A1    Jan. 31, 2013

(30) Foreign Application Priority Data
Mar. 22, 2010 (DK) .................................. 2010 00231

(51) Int. Cl.
G03B 21/26 (2006.01)
G03B 21/28 (2006.01)
F21V 33/00 (2006.01)
G02F 1/1335 (2006.01)

(52) U.S. Cl.
USPC .................. 353/31; 353/98; 353/94; 345/690; 362/231; 362/234; 362/235; 313/110; 349/67

(58) Field of Classification Search
USPC ......... 353/31, 98, 94; 345/690; 362/231, 234, 362/235; 313/110; 349/67
See application file for complete search history.

(56) References Cited

U.S. PATENT DOCUMENTS 7,623,198 B2    11/2009    Noba
2004/0232812 A1    11/2004    Beeson et al.
(Continued)

FOREIGN PATENT DOCUMENTS

DE    10200801    9/2009
EP    1605199    12/2005
(Continued)

OTHER PUBLICATIONS

International Search Report; International Application No. PCT/DK2011/050084; International Filing Date: Mar. 15, 2011; 5 pages.

(Continued)

Primary Examiner — Georgia Y Epps
Assistant Examiner — Magda Cruz
(74) Attorney, Agent, or Firm — Blank Rome LLP

(57) ABSTRACT

The present invention relates to an illumination device comprising a number of light sources and a number light collecting means, where the light collecting means collect light generated by the first light sources and convert the light into a source light beam propagating primarily along a primary optical axis. At least one light modifier is positioned along the primary optical axis and reflect at least a part of the light. A first light source comprises a light converting material capable of converting light into longer wavelengths and a second light source generates light having at least one spectral component which can be converted by the converting material of the first light source. The first and said second light source are mutually positioned in relation to the primary optical axis such that at least a part of a the second source light beam hits the first light source after being reflected by said light modifier.

15 Claims, 5 Drawing Sheets

(56) References Cited

U.S. PATENT DOCUMENTS

| | | | |
|---|---|---|---|
| 2005/0174768 A1* | 8/2005 | Conner | 362/235 |
| 2005/0280785 A1 | 12/2005 | Beeson et al. | |
| 2006/0221613 A1* | 10/2006 | Coushaine et al. | 362/249 |
| 2007/0146639 A1 | 6/2007 | Conner | |
| 2008/0062681 A1 | 3/2008 | Belliveau et al. | |
| 2009/0103296 A1 | 4/2009 | Harbers et al. | |

FOREIGN PATENT DOCUMENTS

| | | |
|---|---|---|
| WO | WO2006/124993 | 11/2006 |
| WO | WO2009/033051 | 3/2009 |

OTHER PUBLICATIONS

Written Opinion; International Application No. PCT/DK2011/050084; International Filing Date: Mar. 15, 2011; 3 pages.

Danish Search Report; Application No. PA2010 00231; dated Nov. 5, 2010; 2 pages.

Danish Office Action; Application No. PA2010 00231; issued on Nov. 5, 2010; 4 pages.

Extended European Search Report; issued Mar. 13, 2014 for the corresponding European Application (i.e., European Application No. 11758845.9; 6 pages).

* cited by examiner

PROJECTING DEVICE WITH MULTIPLE MUTUAL BOOSTING LIGHT SOURCES

FIELD OF THE INVENTION

The present invention relates to an illumination device for illuminating an optical gate of a projecting illumination device projecting an image of the optical gate towards a target surface. The illumination device comprises a light source module generating light, an aperture delimiting the optical gate and a projecting system adapted to project the optical gate at a target surface.

BACKGROUND OF THE INVENTION

Light emitting diodes (LED) are, due to their relatively low energy consumption, long lifetime, and capability of electronic dimming, becoming more and more used in connection with lighting applications. LEDs are successfully used in lighting applications for general illumination such as, wash/ flood lights illuminating a wide area or for generating wide light beams e.g. for the entertainment industry.

However, LEDs have not presently been successfully used in connection with light application systems where an image is created and projected towards a target surface. This is especially the case in connection with entertainment lightning, where a high demand for lumen output and high image quality are required. LED projecting systems have not yet been able to fulfill these requirements.

The light in projecting systems is generally collected into an optical gate where the image is generated, and an imaging optical system projects the gate onto a target surface. WO0198706, U.S. Pat. No. 6,227,669 and U.S. Pat. No. 6,402,347 disclose lighting systems comprising a number of LEDs arranged in a plane array where a converging lens is positioned in front of the LED in order to focus the light, for instance to illuminate a predetermined area/gate or for coupling the light from the diodes into an optical fiber.

U.S. Pat. No. 5,309,277, U.S. Pat. No. 6,227,669, WO0198706, JP2006269182 A2, EP1710493 A2, U.S. Pat. No. 6,443,594 disclose lighting systems where the light from a number of LEDs is directed towards a common focal point or focusing area, for instance by tilting the LEDs in relation to the optical axis (JP2006269182 A2, WO0198706, U.S. Pat. No. 5,309,277) or by using individually refracting means positioned in front of each LED (U.S. Pat. No. 6,443,594, U.S. Pat. No. 7,226,185B, EP1710493). WO06023180 discloses a projecting system comprising a LED array with a multiple number of LEDs where the light from the LEDs is directed towards a target area and where LEDs may be mounted to a surface of a curved base or to a surface of a plane.

U.S. Pat. No. 7,623,198B discloses a light source apparatus having a plurality of light sources different in emission wavelength from each other and a prism sheet having a plurality of mutually parallel fine elongated prisms on at least one surface thereof. Lights from the light sources enter the prism sheet through a light entrance surface of the prism sheet at a predetermined angle and output from an exit surface thereof as color-mixed exiting light. A bandpass mirror is disposed between each light source and the prism sheet to transmit light in a wavelength region emitted from the associated light source and to reflect light in the other wavelength regions.

The prior art fixtures try to increase the lumen output by adding as many light sources as possible. The consequence is, however, that the efficiency with regard to power consumption versus light output is very low. Furthermore, a large amount of light is lost as the prior art fixtures typically only couple a central part of the light of the light beams through the gate in order to provide a uniform illumination of the gate, which again reduces the efficiency. The space in light fixtures is often limited and it is difficult to fit many light sources into prior art fixtures, for instance because the optical components associated with the light sources often take up a lot of space.

DESCRIPTION OF THE INVENTION

The objective of the present invention is to solve or minimize at least some of the above described problems. This can be achieved by the invention as defined by the independent claims. The benefits and advantages of the present invention are disclosed in the detailed description of the drawings illustrating the invention. The dependent claims define different embodiments of the invention.

DETAILED DESCRIPTION OF THE INVENTION

Figure 1A:
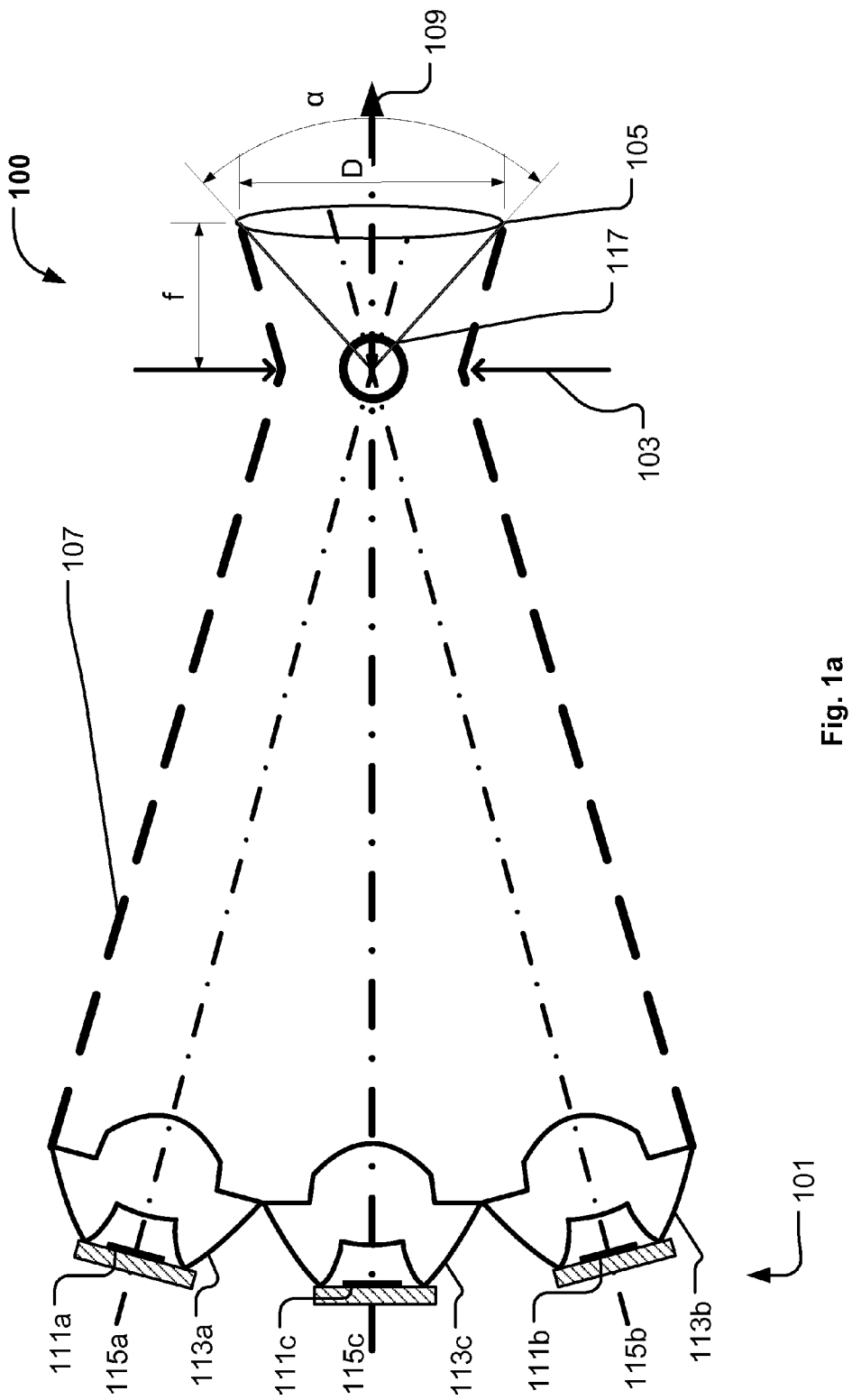
FIGS. 1a and 1b illustrate a general setup of the present invention.
Figure 1B:
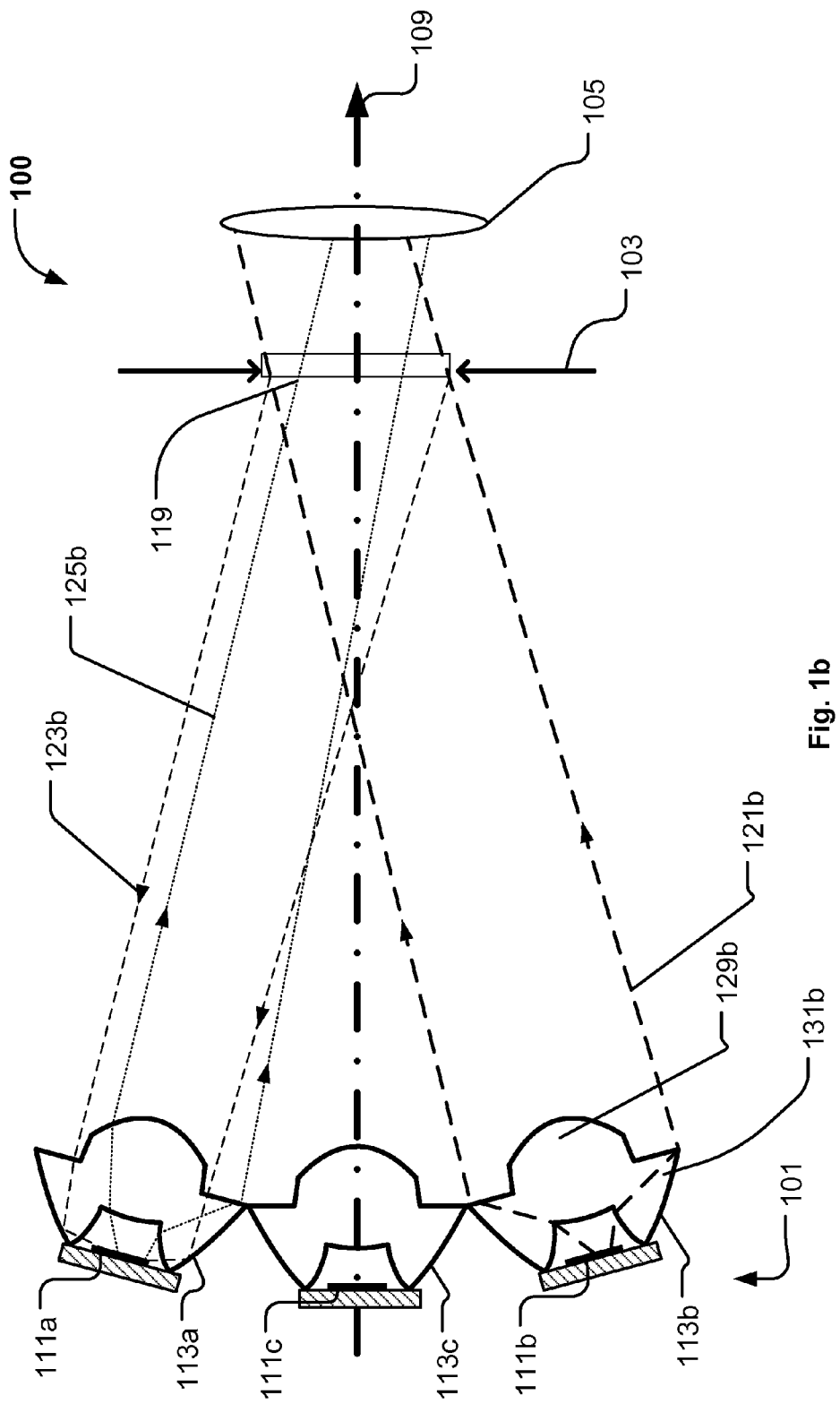

FIG. 1a and 1b illustrate a general setup of the illumination device according to the present invention. The person skilled in the art of optics will realize that some of the shown light rays illustrate the principles behind the present invention rather than illustrating exact precise light rays.

The illumination device 100 comprises a light source module 101, an aperture 103 and a projecting system 105. The light source module generates a light beam (illustrated by thick dashed lines 107) propagating along a primary optical axis 109 towards the aperture 103. The aperture 103 is positioned upstream of the optical axis, with respect to the light source module. The projecting system 105 collects the light which has passed the aperture 103 and projects an image of a plane near the aperture 103 onto a target surface (not shown) a given distance from the projecting system. It is thus possible to arrange a light modifier such as an image generating object near the aperture 103, whereby the generated image will be projected to the target surface. An object plane is thus defined near the aperture and the aperture diameter is limiting the object diameter. The image generating object can for instance be a GOBO, coated texture glass, a LCD, DMD, LCOS, or any object capable of modifying the light beam. The area near the aperture may be defined as a position starting for a small distance in front of the aperture and ending at a small distance after the aperture, where the small distance in front and after of the aperture both do not exceed the cross section of the aperture.

The light source module comprises a number of light sources 111a-111c and a number of light collecting means 113a-113c. The light collecting means collect light from the light sources and generate a source light beam (not illustrated in FIG. 1a for simplicity) propagating along a source optical axis 115a-115c. Each source optical axis can be defined by a three-dimensional vector in relation to a primary optical axis 109 and the largest vector component of the vector defining each source optical axis is aligned with the primary optical axis. The source light beams can thus be angled in relation to the primary optical axis but will primarily propagate along the primary optical axis. The source optical axes meet in a common volume 117 along the primary optical axis. The common volume is a volume near the primary optical axis where at least one source optical axis intersects a plane comprising the primary optical axis, and where at least one source optical axis intersects a plane comprising at least another source axis. The source optical axes can in one embodiment intersect in a common focal point at the primary optical axis but do not, in other embodiments, necessarily intersect in a common focal point and can thus intersect in the common focal volume.

The projecting system 105 has an acceptance angle relative to the primary optical axis. The acceptance angle relative to the primary optical axis defines the maximum angle that a light beam can have in relation to the primary optical axis in order to be projected by the projecting system. Light beams having a larger angle relative to the primary axis will be lost in the optical system. The acceptance angle of a spherical symmetrical projecting system is given as:

$$\frac{\alpha}{2} = \arctan\left(\frac{D/2}{f}\right)$$

where α is the acceptance angle of the projecting system and f is the resulting focal length of the projecting system 105. D is the diameter of the entrance pupil of the projecting system, where the diameter of the entrance pupil is defined as the limiting diameter of the projecting system as seen from the object plane 103 through the front of the first lens. The limiting diameter of the projecting system is defined by the resulting acceptance area of the projecting system. The projecting system is illustrated as a single lens, but the person skilled in the art would understand that the projecting system can comprise any number of lenses and other optical elements, and even be a zoom system with variable focal length. The resulting focal length and resulting acceptance area of the projecting system is thus defined by the optical elements of the projecting system and the skilled person would be able to determine these based on her/his ordinary skills.

FIG. 1b illustrates the illumination device of FIG. 1a where a light modifier 119 has been positioned near the aperture 103. The light modifier 119 can be any object capable of modifying the light beam and also back reflecting a part of the light for instance a GOBO, coated texture glass, a LCD, DMD, LCOS, dichroic filters (color filters, color temperature correcting filters), an iris etc. The source optical axes 115a-115c has been omitted by the sake of simplicity. The illumination device comprises a first light source 111a and first light collecting means 113a. The first light collecting means 113a collect light generated by the first light sources 111a and convert the light into a first source light beam (not shown for simplicity) propagating primarily along the primary optical axis 109.

The first light source comprises a light converting material capable of converting light into longer wavelengths (also known as Stokes shift for instance through fluorescents or Raman shift) and an emitter generating light which interacts with the light converting material whereby a part of the generated light is converted into longer wavelengths. Such light sources are generally known in the art of light sources and can for instance be a white LED based light source where a LED emits UV and/or blue light which is converted by a phosphor/YAG material into light having a board spectra distribution including a large range of wavelengths. The skilled person realizes that a large variety of light sources comprising color converting material can be applied.

A second light source 111b and second light collecting means 113b creates in a similar way a second light beam 121b (in thick dashed lines) propagating primary along the primary optical axis. The light modifier reflects at least a part of the light generated by the light sources and the first and said second light source are mutually arranged in relation to the primary optical axis 109 such that at least a part 123b (in thin dashed lines) of a the second source light beam 121b hits the first light source 111a after being reflected by the light modifier. The second light source 111b generates light having at least one spectral component which can be converted by the converting material of the first light source. The reflected part 123b of the second light source beam will hit the converting material of the first light source 111b whereby the reflected part 123b is used to generate more light having longer wavelengths. The converting material emits converted light substantially into the entire solid angle and a part of 125b (in thin dotted lines) the converted light will be emitted along the first source light beam and thus increase the luminance of the total light beam of the illumination device.

This setup is for instance useful in connection with white light projecting devices where the light source are based on white phosphor LEDs and where the light modifier is a dichroic color filter adapted to pass long wavelengths (e.g. green and/or red light) in order to provide at colored light beam. The white phosphor LEDs generate a board spectra of wavelengths and short wave wavelength (e.g. blue and/or UV) are reflected by the light modifier and hit the color converting material of an another light source where the back reflected light is converted into longer wavelengths which can pass through the dichroic filter and thus increase the lumen of the outgoing light beam.

The applicant has measured that the intensity of the outgoing light can be increased by 5% due light reflected back by a dichroic filter. The measurement was performed by measuring the intensity of the outgoing beam of a setup where the first light source was turned off, the second light source turned on and a red dichroic filter positioned a distance along the primary axis and measuring the outgoing beam of the same setup where the converted light from the first light source was blocked. The first and second light source were in the setup Luminus™ CBT-90W™ diodes. The dichroic filter was in this setup positioned between the light sources and the common volume and at the distance form the dichroic filter to the common volume is larger than the diameter of the aperture. Further the applicant has measured an increase in output of 19% in a setup where the dichroic filter is positioned approximately in the common volume, The setup is also useful in connection with GOBOs, as GOBOs typical reflect a part of the light and the back reflected light which is normally lost can be "recycled" and converted into useful light at longer wavelengths. The applicant has measured that the intensity of the outgoing light can be increased by 19% due light reflected back by a GOBO. The measurement was performed by measuring the intensity of the outgoing beam of a setup similar to FIG. 1b where the first light source was turned off, the second light source turned on and a GOBO positioned a distance along the primary axis and measuring the outgoing beam of the same setup where the converted light from the first light source was blocked. The first and second light source were in the setup Luminus™ CBT-90W™ diodes. The GOBO was in this setup positioned approximately in the common volume.

The effect can be increased further if the second light source 121b also comprises a color converting material and if the first light source 121*a* also generates light having at least one spectral component which can be converted by the converting material of the second light source. This can be achieved by arranging the light sources in pairs which are positioned symmetrical and at opposite angle in relation the optical primary optical axis. The back reflected light form both light sources will thus hit the other light source and be converted into longer wavelengths.

The setup can also be optimized by adapting the first light collecting means to concentrate the back reflected second source light beam onto the first light source. This ensure that the back reflected second source light beam hits the light converting material of the first light source The second light collecting means can also be adapted to concentrate the back reflected second source light beam onto said first light collecting means. It is hereby possible to create an optical system where most of the back reflected second light beam hits the light converting material. This can for instance be achieved by arranging the first and second light sources in relation to each other and designing the first and second light collecting means to create an image of the second light source at the first light source.

Light collecting means 113*a*-113*c* can be embodied as any kind of optical means which can collect light and change the divergence of the collected light for instance a number of optical lenses, a reflector, TIR lenses or any combination of these. The light collecting means is in FIG. 1*a* and 1*b* illustrated as TIR lenses where only the TIR lens related to the second light source is described for simplicity. The second light collecting means 113*b* comprises a central lens 129*b* aligned along the source optical axis and a peripheral lens 131*b* at least partially surrounding the central lens. The central lens 129*b* collects a first part of the light generated by the light source 111*b*. The central lens can be adapted to image the second light source 111*b* at the first light source 111*a* whereby most of the back reflected part of the second light beam is concentrated at the first light source 111*a*. This can be achieved by adapting the optical distance between the second light source and the first light source and the optical properties of the central part of the first and second light collecting means as known in the art of optical design.

The central lens can further be adapted to image the light source 111*b* at a position approximately between the aperture and the entrance pupil of the projecting optics. That the image of the light source can thus be created in a position starting for a small distance in front of the aperture and ending at a small distance after the entrance pupil of the projecting system. The small distance in front of the aperture does not exceed the cross section of the aperture and the small distance after the entrance pupil does not exceed the cross section of the entrance pupil. It is hereby possible to optimize to optical system to provide a uniform illumination of the aperture and at the same time collect much of the light by the projecting system.

The skilled person realize the a similar optimization can be performed by adapting the second light collecting means to concentrate at least a part of the beck reflected first source light beam onto the second light source and/or adapting the first light collecting means to concentrate the back reflected first source light beam onto said second light collecting means.

A third light source 111*c* and third light collecting means 113*c* creates in a similar way a third light beam (not shown for simplicity) propagating primary along the primary optical axis. The third light source is positioned at and symmetrical around the primary axis 109 and the third light source will thus propagate substantial along the primary optical axis. The light modifier will reflects at least a part of the third source light beam back to the third light source where it can be used in conversion material of the third light sources.

The light modifier is in one embodiment a color temperature correcting filter which correct the color temperature of light beam to lower color temperature be filtering short waved light away. The short waved light is back reflected by the color temperature correcting filter and converted by another light source into longer wavelengths whereby the intensity of the outgoing light beam is increased.

In the illustrated embodiment the first 111*a* and second 111*b* light sources are angled in relation the primary optical axis 109. However the skilled person realize that this may not be the case in other embodiments, as it is possible to position the first and second light sources on a plane surface and use optical means like lens, prisms, mirrors, filters etc. to direct the light beams towards the light modifier. In such embodiment the or by using individually refracting means positioned in front of each LED can be used to direct the light beams towards the light modifier for instance as by U.S. Pat. No. 6,443,594, U.S. Pat. No. 7,226,185B or EP1710493.

Figure 2A:
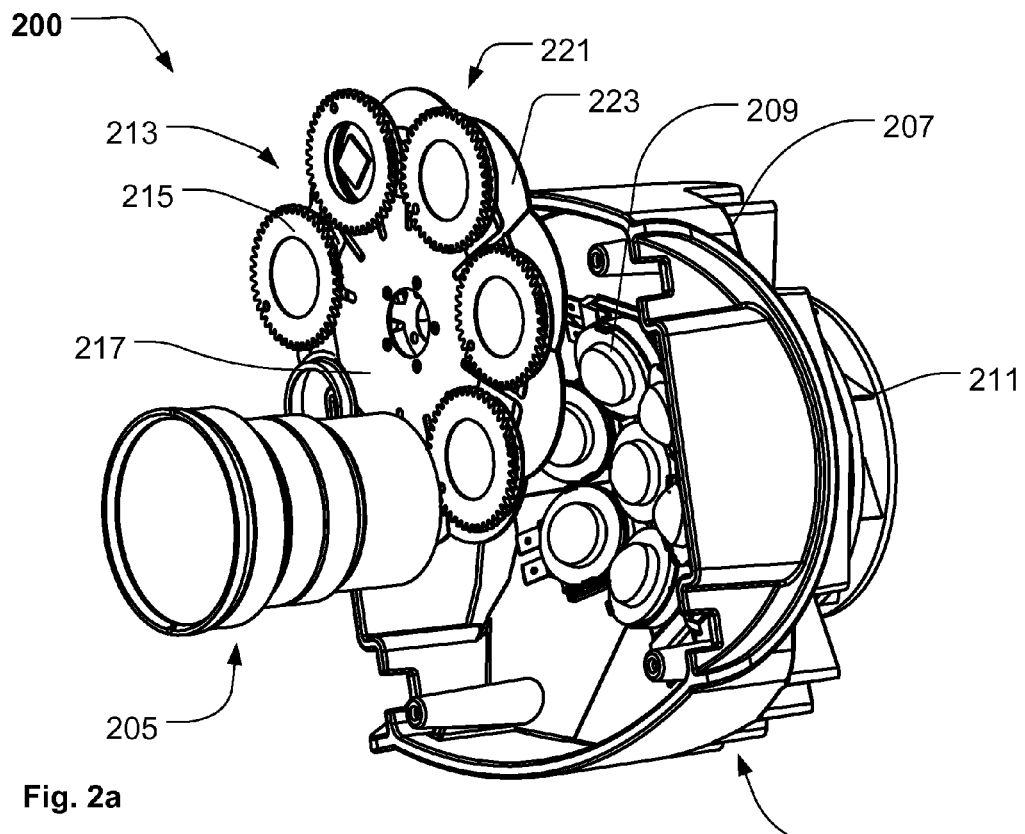
FIGS. 2a and 2b illustrate a GOBO projector including an illumination device according to the present invention.
Figure 2B:
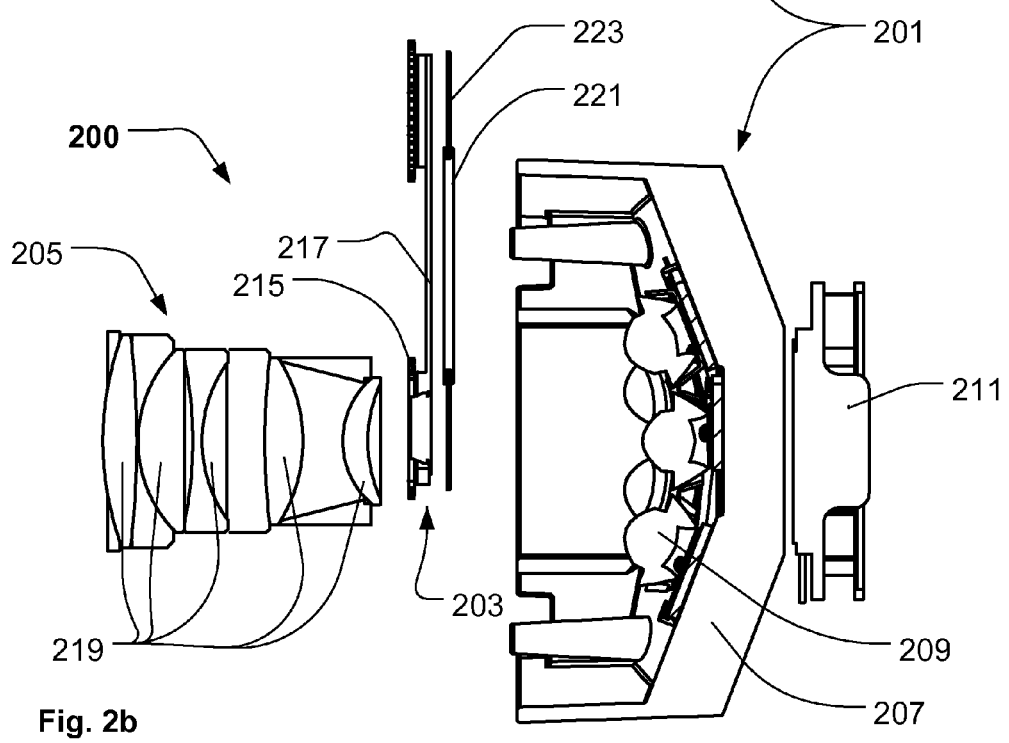

FIGS. 2*a* and 2*b* illustrate a possible embodiment of the illumination device according to the present invention, where FIG. 2*a* and FIG. 2*b*, respectively, illustrate a perspective view and a cross sectional view of the illumination device. The illumination device is here embodied as a GOBO projector 200 adapted to image the GOBO onto a target surface. The GOBO projector comprises a light source module 201, aperture 203 and projecting system 205.

The light source module comprises a number of white phosphor LEDs arranged at a cooling module 207 (illustrated in further detail in FIG. 3*a* and 3*b*) and below a number of TIR (Total Internal Reflection) lenses 209. The light source module further comprises blowing means 211 in the form of a fan adapted to force air towards a number of cooling fins on the backside of the cooling module. The TIR lenses act as light collecting means and collect and direct, as described above, the light from the LEDs towards the aperture and projecting system.

The gobo projector 200 comprises a gobo wheel 213 comprising a number of gobos 215 mounted on a rotating carousel 217 as known in the art of entertainment lighting. The gobo wheel can for instance be embodied as described in U.S. Pat. No. 5,402,326, U.S. Pat. No. 6,601,973, U.S. Pat. No. 6,687,063 or US2009/0122548 incorporated herein by reference. Each gobo can be moved into aperture 203 by rotating the carousel. The projecting system is adapted to create an image of the gobo at a target surface (not shown) and comprises a number of optical lenses 219.

The illustrated gobo projector further comprises a color wheel 221 comprising a number of optical filters 223 (e.g. dichroic filters, color gels or the like) which can also be positioned into the light beam. The color wheel is useful in the case that the light sources produce a white light beam and can be used to create a certain color of the light beam.

Figure 3A:
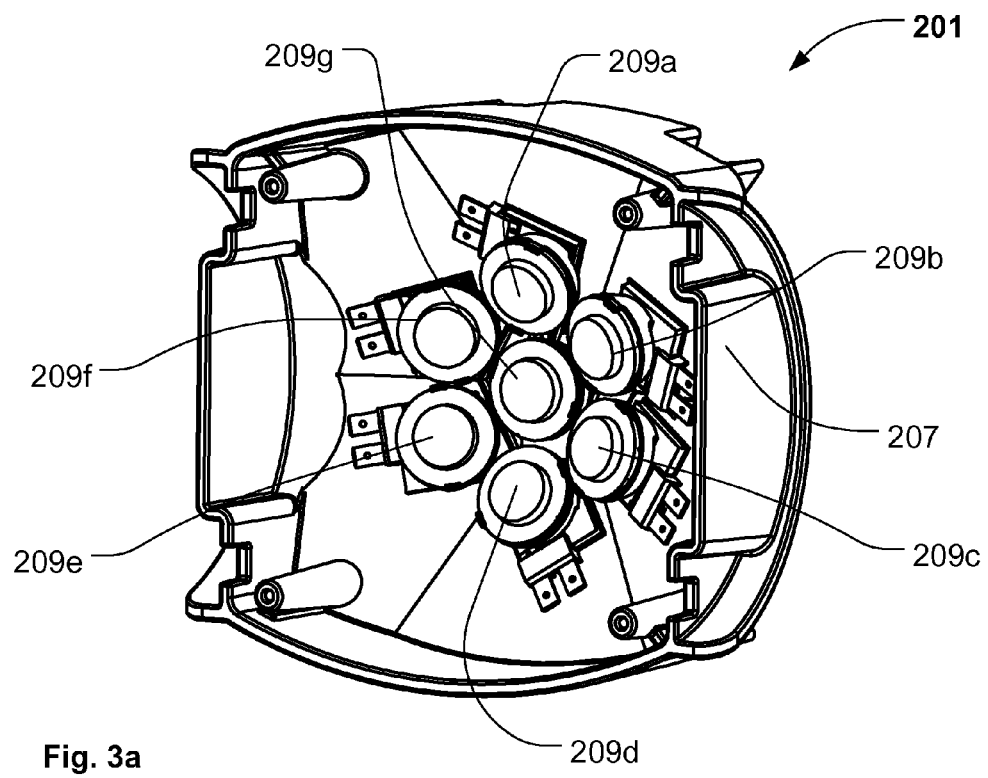
FIGS. 3a and 3b illustrate a cooling module used in the GOBO projector illustrated in FIG. 2a and 2b.
Figure 3B:
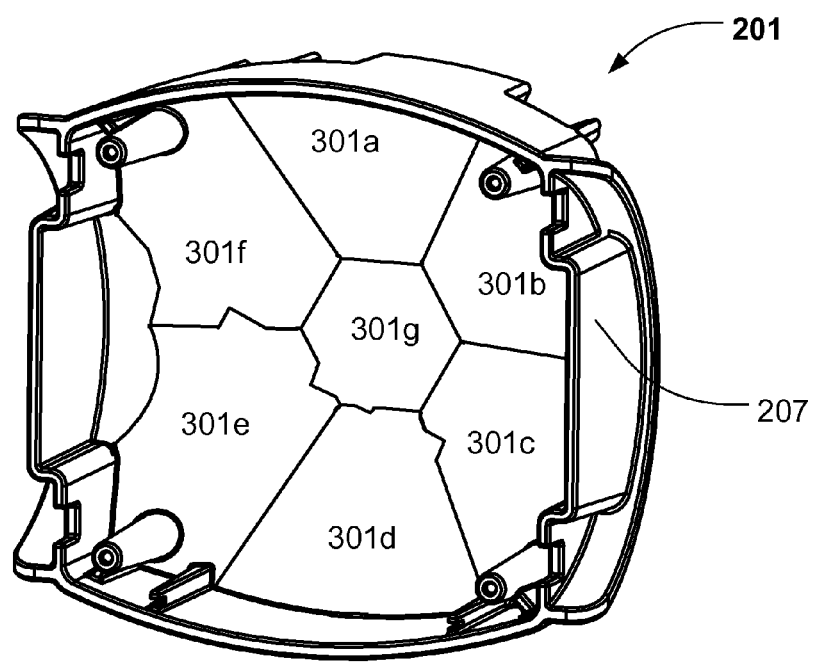

FIGS. 3*a* and 3*b* illustrate a perspective front view of the light source module 201 used in the gobo projector illustrated in FIG. 2*a* and 2*b*. FIG. 3*a* and 3*b* illustrate the light module with LEDs and without LEDs, respectively. The light source module comprises a cooling module 207 having a first side comprising a number of plane mounting surfaces 301*a*-301*f* whereto a LED and its corresponding TIR lens (209*a*-209*f*) are mounted. Center mounting surface 301*f* is mounted perpendicularly to the optical axis, and the LED and TIR 209*g* lens are positioned such that the primary optical axis goes through the LED and TIR lens 209*g*. The consequence it that at least a part of the light generated be the central LED is reflected back to the light source when a GOBO and/or a dichroic filter is positioned in the light beam. The back reflected light can as described above be converted into longer wave lengths and thus be recycled.

The peripheral mounting surfaces 301a-301f are angled relative to mounting surface 301g, and the light from the LEDs is directed towards the aperture. The peripheral mounting surfaces are arranged in pairs (301a+301d; 301b+301e; 301c+301f) symmetrical around the optical axes and angled at opposite angles in relation to the optical axis. The light from each light source will as a consequence by a GOBO and/or a dichroic filter be reflected onto the other light source of the light source pair can thus be converted and recycled as described above. The angle of the peripheral mounting surfaces are further designed such that the light emitted by the LEDs will hit the projecting system within the acceptance angle and cross section of the projecting system as described above. The plane mounting surfaces make it possible to mount the LEDs on plane circuit boards secured to the plane mounting surfaces. The result is that the heat generated by the LED can be dissipated from the circuit board through the plane mounting surfaces very easily as it is possible, in contrast to curved mounting surfaces, to provide tight contact over a large contact surface between the circuit board and the plane mounting surface. The different mounting surfaces are further interconnected resulting in the fact that heat from neighboring LEDs can be dissipated at least partially away through the neighboring mounting surface. This is useful in the case where different color LEDs are used and where some LEDs might periodically be turned off. LEDs which are turned on can in this case use the mounting surface and heat sink area related to turned off LEDs whereby more heat can be dissipated. The second side, which is opposite the first side, of the cooling module can comprise a number of cooling fins improving the cooling effect of the LED.

The GOBO projector is in FIGS. 2 and 3 illustrated as a white light projector where at least one color wheel is used to create a colored light beam through subtractive color mixing. The projector can however also be embodied as an additive multicolored projector where different colored light from different light sources are combined and where the color of the light beam is changed based on additive color mixing. Additive color mixing are known in the art of dynamic lighting and can instance be embodied as a number of red, green and blue LEDs where the color mixing is based on the intensity of the different colors. The intensity of the different colors can for instance be controlled by the commonly known pulse width modulation (PWM) method, or by adjusting the DC current through each color LED.

The present invention can also be used in a multi colored illumination device comprising a number of light sources generating different colors. In this embodiment at least one light source generates light using a color converting material and at least another light source generates light which can be converted by the converting material of the first light source and the two light sources are arrange such that a light modifier reflects at least a part of the light from the second light source such that the it hits the converting material of the first light source. This can for instance be achieved by providing a Red phosphor LED which converts UV/blue light into red light and providing a Blue LED opposite the RED phosphor LED. The blue light will thus be reflected by the light modifier and be converted by the converting material of the RED phosphor LED. The skilled person will be able to construct a large variety of setups where light from one light source is converted by a converting material of another light source.

The blue LED can in fact be turned on to it's maximum without effecting the color of outgoing light beam if a red dichroic filter is positioned in the light beam, as substantially all of the blue light will be reflected onto the RED phosphor led where it is converted into red light.

The consequence is that the number of red LED need to generate a certainty luminance can be reduced. It is for instance possible to use a graduate dichroic color filter or a color filter having a number of dichroic fingers as known for CMY flags of conventional gobo projectors using discharge lamps.

The embodiments regarding the multicolored illumination device using additive color mixing is above described in view of red and blue LEDs but the skilled person realizes that other light sources can be used as long as one light source emits light that can be converted by the converting material of the second light source.

Figure 4:
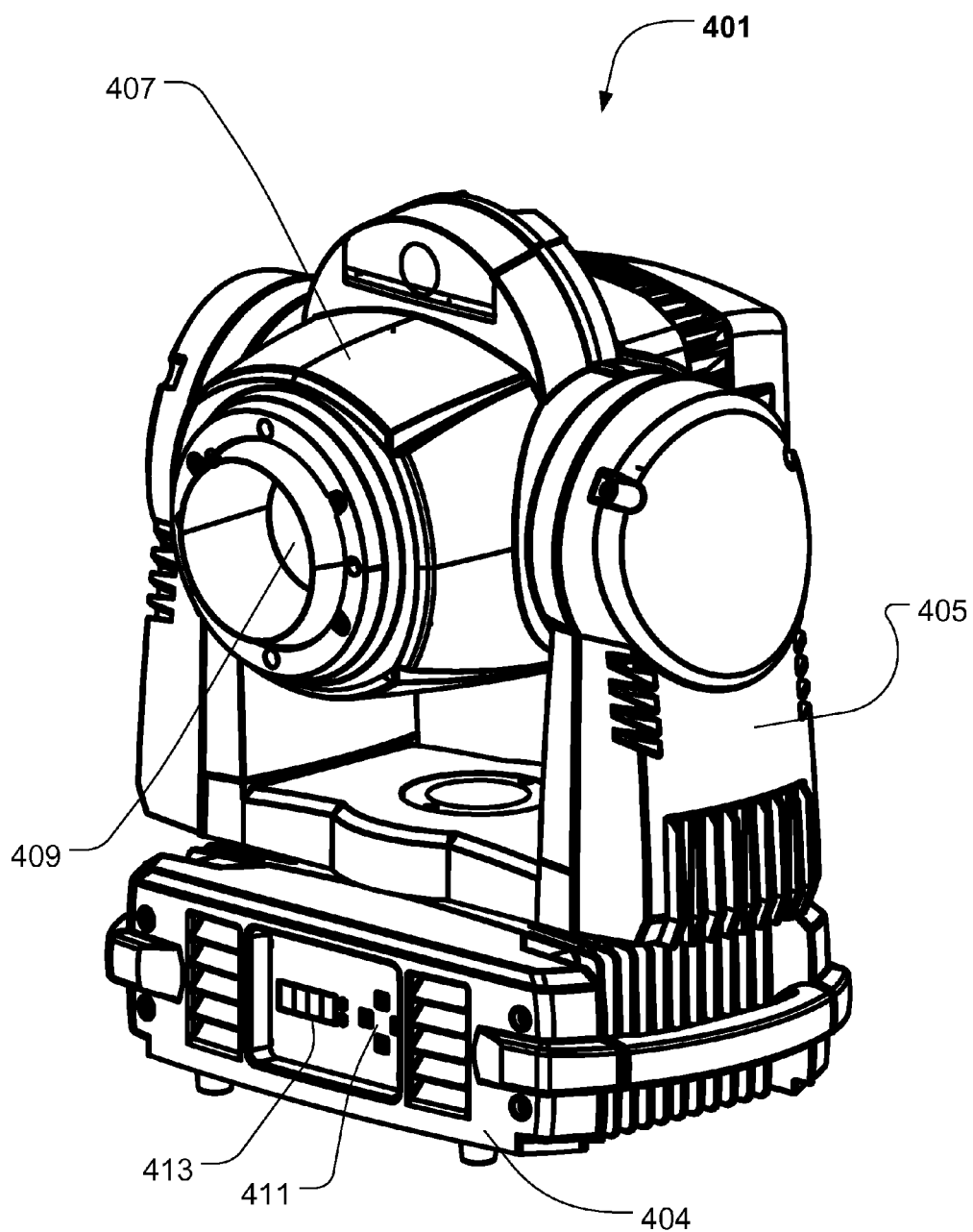
FIG. 4 illustrates a moving head light fixture according to one aspect to the present invention.

FIG. 4 is a perspective view of moving head light fixture 401 where the GOBO projector of FIG. 2-3 has been integrated into the head. The moving head lighting fixture 401 comprising a base 403, a yoke 405 rotatable connected to the base and a head rotatable connected 407 to the yoke. The head comprises an illumination device according to the present invention and generates a light beam (not shown) exiting the head through an exit lens 409 of the projecting system (205 of FIG. 2). The moving head light fixture comprises first rotating means for rotating the yoke in relation to the base, for instance by rotating a shaft connected to the yoke by using a motor positioned in the base. The moving head light fixture comprises also second rotating means for rotating the head in relation to the yoke, for instance by rotating a shaft connected to the head by using a motor positioned in the yoke. The skilled person would realize that the rotation means could be constructed in many different ways using mechanical components such as motors, shafts, gears, cables, chains, transmission systems etc.

The moving head light fixture receives electrical power from an external power supply. The electrical power is received by an internal power supply which adapts and distributes electrical power through internal power lines to the subsystems of the moving head. The internal power system can be constructed in many different ways. The light fixture comprises also a controller which controls the other components (other subsystems) in the light fixture based on an input signal indicative of at least one light effect parameter and at least one position parameter. The controller receives the input signal from a light controller (not shown) as known in the art of intelligent and entertainment lighting for instance by using a standard protocol like DMX, ArtNET, RDM etc. The light effect parameter is indicative of at least one light effect parameter of said light beam for instance the amount of dimming and/or the dimming speed of the light beam, a color that a CMY system should mix, the kind of color filter that a color filter system should position in the light beam and/or the kind of gobo that the gobo system should position in the light beam, the divergence of the light beam that light fixture should create using a zoom system, a focus distance that indicate the distance form the lens to a surface where a gobo effect should be imaged, etc.

The controller is adapted to send commands and instructions to the different subsystems of the moving head through internal communication lines. The internal communication system can be based on a various type of communications networks/systems.

The moving head can also have user input means enabling a user to interact directly with the moving head instead of using a light controller to communicate with the moving head. The user input means 411 could for instance be bottoms, joysticks, touch pads, keyboard, mouse etc. The user input means could also be supported by a display 413 enabling the user to interact with the moving head through menu system shown on the display using the user input means. The display device and user input means could in one embodiment also be integrated as a touch screen.

The present invention can for instance be implemented into a projecting device comprising a digital imaging device such as a DML, DLP, LCD, LCOS or into the head of a moving head light fixture comprising a base, a rotatable yoke connected to the base and a rotatable head connected to the yoke. Hereby a power efficient digital projecting device or a moving head with uniform illumination of the imaging gate and without color artifacts is provided.

The invention claimed is:

1. An illumination device comprising:
   a first light source and a first light collecting means, said first light collecting means collecting light generated by said first light source and converting said light into a first source light beam propagating primarily along a primary optical axis;
   a second light source and a second light collecting means, said second light collecting means collecting light generated by said second light source and converting said light into a second source light beam propagating primarily along said primary optical axis;
   at least one light modifier positioned along said primary optical axis, said light modifier being adapted to modify at least a part of said first and/or said second source light beam; said light modifier reflecting at least a part of said first and/or said second source light beam;
   wherein
   said first light source comprises a light converting material, said light converting material being capable of converting light into longer wavelengths; said second light source generates light having at least one spectral component which can be converted by said light converting material of said first light source;
   said first and said second light sources being mutually arranged in relation to said primary optical axis such that at least a part of said second source light beam hits said first light source after being reflected by said light modifier.

2. The illumination device according to claim 1, wherein:
   said second light source comprises a light converting material, said light converting material being capable of converting light into longer wavelengths;
   said first light source generates light having at least one spectral component which can be converted by said light converting material of said second light source;
   said first and said second light sources being mutually arranged in relation to said primary optical axis such that at least a part of said first source light beam hits said second light source after being reflected by said light modifier.

3. The illumination device according to claim 1, wherein said first and said second light sources are arranged symmetrically around said primary optical axis.

4. The illumination device according to claim 1, wherein said first and said second light sources are arranged at opposite angles in relation to said primary optical axis.

5. The illumination device according to claim 1, wherein said first source light beam and said second source light beam intersect at a common volume along said primary optical axis and said light modifier is arranged at said common volume.

6. The illumination device according to claim 1, wherein said at least one light modifier is a dichroic filter reflecting at least one spectral component which can be converted by said light converting material.

7. The illumination device according to claim 1, wherein said at least one light modifier is a GOBO reflecting at least one spectral component which can be converted by said light converting material.

8. The illumination device according to claim 1, wherein said first light collecting means concentrates at least a part of said back reflected second source light beam onto said first light source.

9. The illumination device according to claim 1, wherein said second light collecting means is adapted to concentrate said back reflected second source light beam onto said first light collecting means.

10. The illumination device according to claim 1, wherein said second light collecting means concentrates at least a part of said back reflected first source light beam onto said second light source.

11. The illumination device according to claim 1, wherein said first light collecting means is adapted to concentrate said back reflected first source light beam onto said second light collecting means.

12. The illumination device according to claim 1, further comprising a projecting system positioned after said light modifier along said primary optical axis, said projecting system collecting a part of said light generated by said light sources and projecting said collected light along said primary optical axis.

13. A moving head light fixture comprising a base, a yoke rotatably connected to said base and a head rotatably connected to said yoke, said head comprising a projecting system adapted to collect and project light along a primary optical axis wherein said head comprises an illumination device according to claim 1, and said projecting system collects a part of said light generated by said illumination device.

14. The moving head light fixture according to claim 13, wherein said projecting system is adapted to image at least one light modifier at a target surface a distance along said primary optical axis.

15. A digital projecting device comprising a digital imaging device and a projecting system, said digital imaging device being adapted to modify a light beam and said projecting system being adapted to image said digital imaging device at a target surface a distance along a primary optical axis wherein said digital imaging device comprises an illumination device according to claim 1, and said illumination device illuminates said digital imaging device.

\* \* \* \* \*